US012067840B2

(12) United States Patent
Leriche

(10) Patent No.: US 12,067,840 B2
(45) Date of Patent: Aug. 20, 2024

(54) SYSTEMS AND METHODS TO AWARD CASH BACK CHIPS FOR CASINO TABLE GAME PLAY OR IMPLEMENT PROMOTIONS USING FREE PLAY CHIPS

(71) Applicant: Shad Leriche, Montreal (CA)

(72) Inventor: Shad Leriche, Montreal (CA)

(73) Assignee: SL Enterprise (CA)

( * ) Notice: Subject to any disclaimer, the term of this patent is extended or adjusted under 35 U.S.C. 154(b) by 0 days.

(21) Appl. No.: 16/950,739

(22) Filed: Nov. 17, 2020

(65) Prior Publication Data

US 2022/0157121 A1 May 19, 2022

(51) Int. Cl.
*G07F 17/32* (2006.01)

(52) U.S. Cl.
CPC ...... *G07F 17/3248* (2013.01); *G07F 17/3239* (2013.01)

(58) Field of Classification Search
CPC .... G07F 17/32; G07F 17/322; G07F 17/3227; G07F 17/3239; G07F 17/3244; G07F 17/3248; G07F 17/3255; G07F 17/326; G07F 17/3288; G07F 17/3293
See application file for complete search history.

(56) References Cited

U.S. PATENT DOCUMENTS 7,862,425 B2 * 1/2011 Cavagna ............. A63F 3/00157 273/146
2003/0008707 A1 * 1/2003 Walker ................... G06Q 30/02 463/25
2004/0082384 A1 * 4/2004 Walker ................ G07F 17/3237 463/40
2005/0266919 A1 * 12/2005 Rowe ..................... G06Q 20/02 463/25
2007/0161424 A1 * 7/2007 Gatto .................. G07F 17/3244 463/20
2007/0298873 A1 * 12/2007 Nguyen .................. G07F 17/32 463/27

(Continued)

OTHER PUBLICATIONS

Stevens, Michael. "How Do Casino Matchplay Chips and Coupons Work". GamblingSites.org. [dated Aug. 8, 2020], [online], [retrieved on Dec. 2, 2021]. <URL: https://www.gamblingsites.org/blog/how-do-casino-matchplay-chips-and-coupons-work/>. 6 Pages. (Year: 2020).*

(Continued)

*Primary Examiner* — Milap Shah
(74) *Attorney, Agent, or Firm* — FisherBroyles, LLP; Rob L. Phillips

(57) ABSTRACT

A gaming system and method including the distribution of cashless chips. If a player achieves a pre-established amount of player points over a designated time period, the system causes the player to receive the cashless gaming chips. The cashless gaming chips may be earned based on various criteria entered by the casino or operator. The system is customizable and may be interfaced with the casino's existing player tracking system and comp system. The cashless gaming chips may be played under specific rules implemented by the casino. For example, the gaming chips may be played only once and do not have independent cash value. Promotions may also be implemented using an exchange of free play chips for cash.

16 Claims, 8 Drawing Sheets

(56) References Cited

U.S. PATENT DOCUMENTS

| | | | | |
|---|---|---|---|---|
| 2009/0115133 | A1* | 5/2009 | Kelly | A63F 13/52 273/274 |
| 2009/0170595 | A1* | 7/2009 | Walker | G07F 1/06 463/25 |
| 2010/0093429 | A1* | 4/2010 | Mattice | G07F 17/3232 463/25 |
| 2010/0227674 | A1* | 9/2010 | Neo | G07F 17/3239 463/25 |
| 2010/0268587 | A1* | 10/2010 | Buchheit | G06Q 30/0601 705/14.17 |
| 2018/0122187 | A1* | 5/2018 | Moore | G07F 17/3248 |
| 2019/0066431 | A1* | 2/2019 | Waxman | G07F 17/3293 |
| 2020/0111279 | A1* | 4/2020 | Cleveland | G06Q 20/3276 |

OTHER PUBLICATIONS

Shackleford, Michael. "Promotional, Match-Play, and Non-Negotiable Chips". WizardOfOdds.com. [dated Jul. 19, 2019], [online], [retrieved on Dec. 3, 2021]. <URL: https://wizardofodds.com/gambling/promotional-chips/>. 5 Pages. (Year: 2019).*

* cited by examiner

Fig. 3

| | |
|---|---|
| PTS COMP | 5% |
| POINTS/$ | 10% |
| PTS HOLD | 16% |
| HOLD AVG | 10% |
| ROULETTE 1 | 10% |
| ROULETTE 2 | 10% |
| WAR | 18% |
| BJ1 | 15% |
| BJ2 | 15% |
| BJ3 | 15% |
| 3 CRD PKER | 25% |
| TX POKER | 20% |

300

500

600

SYSTEMS AND METHODS TO AWARD CASH BACK CHIPS FOR CASINO TABLE GAME PLAY OR IMPLEMENT PROMOTIONS USING FREE PLAY CHIPS

FIELD OF THE INVENTION

The embodiments of the present invention relate to systems and methods for providing table game players an opportunity to receive cash back, in the form of cashless chips, based on play.

BACKGROUND

While casinos derive much of their gaming revenue from electronic gaming machines such as slot machines and video poker machines, table games remain a significant draw for players. Table games like Blackjack, Roulette, Craps and others continue to drive traffic and bring in substantial revenue. There are many people and companies focused on bringing new table games to the market. Unfortunately, it is very challenging to bring a new table game into a casino and an even bigger challenge to make it succeed.

Consequently, there is a need to generate more play at existing, well-known table games. The embodiments of the present invention do so by rewarding players meeting pre-established criteria with unique playable gaming chips that may be played at casino table games. The unique gaming chips have no cash value and are only permitted to be played at designated table games.

SUMMARY

In one embodiment of the present invention, a pit gaming system comprises broadly a player tracking system configured to track the player of registered players; a database of registered players updated pursuant to tracked play thereof; a play threshold module configured to determine when any player meets a minimum play threshold; a reward module configured to cause an award of unique gaming chips having no cash value to players meeting said minimum play threshold and a tracking module configured to track dispensing and play of the unique gaming chips.

In one embodiment, if a player achieves a pre-established amount of player points over a designated time period, the system causes the player to receive the unique gaming chips. As detailed below, the unique chips may be earned based on various criteria entered by the casino or operator. That is, the system is customizable and may be interfaced with the casino's existing player tracking system and comp system.

In one embodiment, the unique gaming chips may be played under specific rules implemented by the casino. For example, the gaming chips may be played only once and do not have independent cash value. In another embodiment, the free play chips may be exchanged for cash during certain promotions. In such an embodiment, the free play chips are subject to limitations on how they maybe played.

Other variations, embodiments and features of the present invention will become evident from the following detailed description, drawings and claims.

BRIEF DESCRIPTION OF THE DRAWINGS

FIG. 3 illustrates a chart of exemplary player tracking parameters of the type suitable for the system and method according to the embodiments of the present invention;

DETAILED DESCRIPTION

Figure 1:
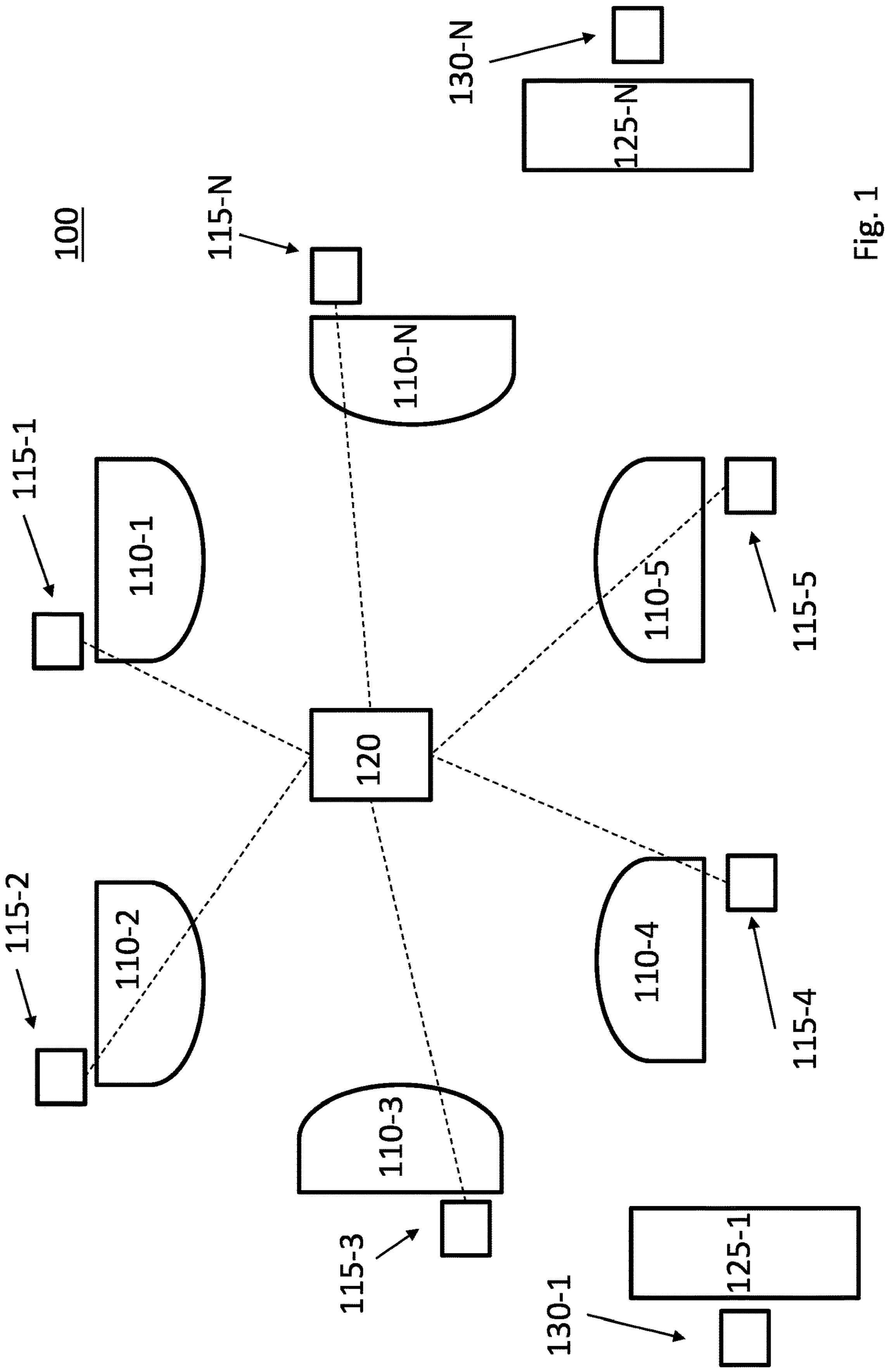
FIG. 1 illustrates an exemplary overhead view of a pit area associated with a typical casino.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a standalone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "gaming machine" should be understood to be any one of a general purpose computer, as for example a personal computer, laptop computer, standalone machine, a client computer configured for interaction with a server, a special purpose computer such as a server, or a smart phone, soft phone, tablet computer, personal digital assistant or any other machine adapted for executing programmable instructions in accordance with the description thereof set forth above.

The embodiments of the present invention are suitable for implementation in a casino pit area as shown in FIG. 1. The casino pit area 100 includes a plurality of casino tables 110-1 through 110-N configured to facilitate play of numerous casino table games such as Blackjack, Craps, Roulette, Three Card Poker, Let it Ride and countless others. Each casino table 110-1 through 110-N has an associated table computer 115-1 through 115-N configured to permit dealers to track player play via player tracking cards readable by a card reader in communication with the table computer 115-1 through 115-N. Each table computer 115-1 through 115-N communicates with a central casino computer system 120 running player tracking software, accounting software, management software and the like. Proximate to the casino pit area 100 are one or more casino cages 125-1 through 125-N staffed by personnel that may exchange gaming chips and gaming tickets for cash, provide casino credit and handle other administrative matters associated with play in the casino. The one or more casino cages 125-1 through 125-N include cage computers 130-1 through 130-N in communication with the central casino computer system 120.

A similar arrangement may be installed across multiple commonly-owned casinos whereby a casino computer system for each casino communicates with a primary computer dedicated to managing all of the commonly-owned casinos based on data received from the local casino computer systems.

Tracking play at each casino table 110-1 through 110-N is well-known and includes identifying the player via a player tracking card and identification, entering the player into the respective table computer 115-1 through 115-N, and entering how much money and the limits the player plays during the gaming session. Some systems use RFID gaming chips and other systems to more precisely monitor the parameters of play.

Regardless of the system used, the objective of player tracking for the casino is to acquire player trends and data to better understand player habits so that the casino may adjust operations accordingly. The player tracking data may also be used to award player comps to maintain the loyalty of players. Comps come in many forms including free or discounted meals, entertainment, rooms, VIP access, cash, etc. There are many methods for determining the value and types of comps to provide players from tracking the amount wagered during a gaming session, tracking the amount wagered per hand, tracking the length of gaming sessions, tracking theoretical win, tracking actual win and so on. Based on this data, the casino uses a formula to determine the value and types of comps to provide players.

Figure 2:
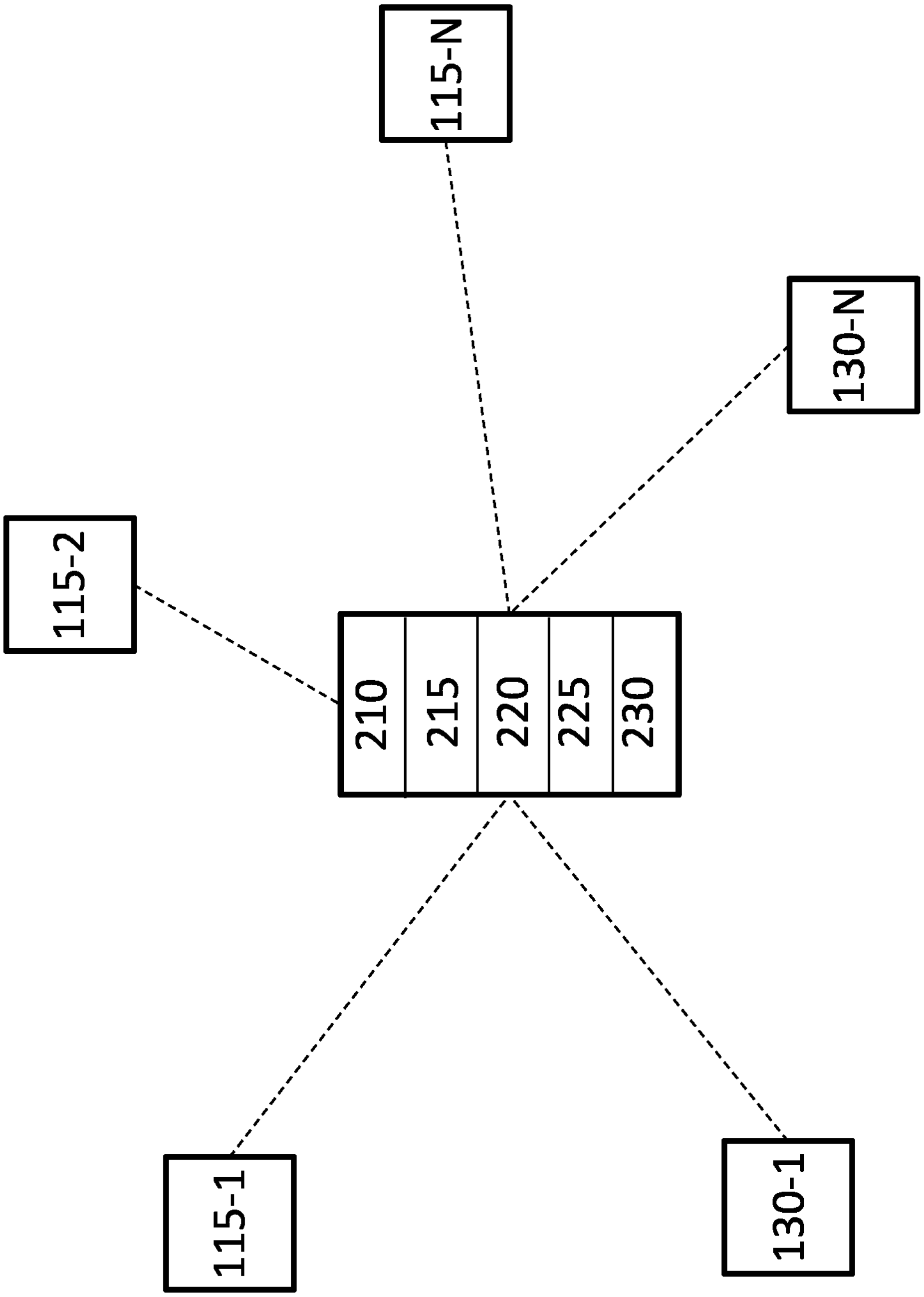
FIG. 2 illustrates a block diagram of a casino management system of the type that may interface with, or include, a table game rewards system as detailed herein.

FIG. 2 shows a casino management system 200 of the type that communicates with the table computers 115-1 through 115-N and cage computers 130-1 through 130-N. The casino management system 200 comprises a server 205 running various software modules including a player tracking module 210, accounting module 215, POS module 220, kiosk/ATM module 225, reservations module 230, etc. Numerous companies, including Agilysys and Aristocrat, offer such casino management products to casinos.

FIG. 3 shows a chart 300 detailing exemplary player tracking parameters used to generate player rewards based on player play. A first parameter 305 relates to a comp %, shown as 5%, relative to the hold (i.e., potential earnings for the casino). A second parameter 310 relates to a number of points awarded to the player for each dollar earned by the casino. Casinos set both parameters 305, 310 based on internal calculations and desires. Those skilled in the art will recognize that different values and different parameters may be used without departing from the spirit and scope of the embodiments of the present invention. Chart 300 also lists an average hold % across all tables 315 and individual table hold % 320 used to generate the player rewards.

It is the casino player tracking system, regardless of type, from which the embodiments of the present invention rely. From the player tracking data established from player play at table games, according to the embodiments of the present invention, players are provided unique gaming chips to play according to pre-established conditions.

Figure 4:
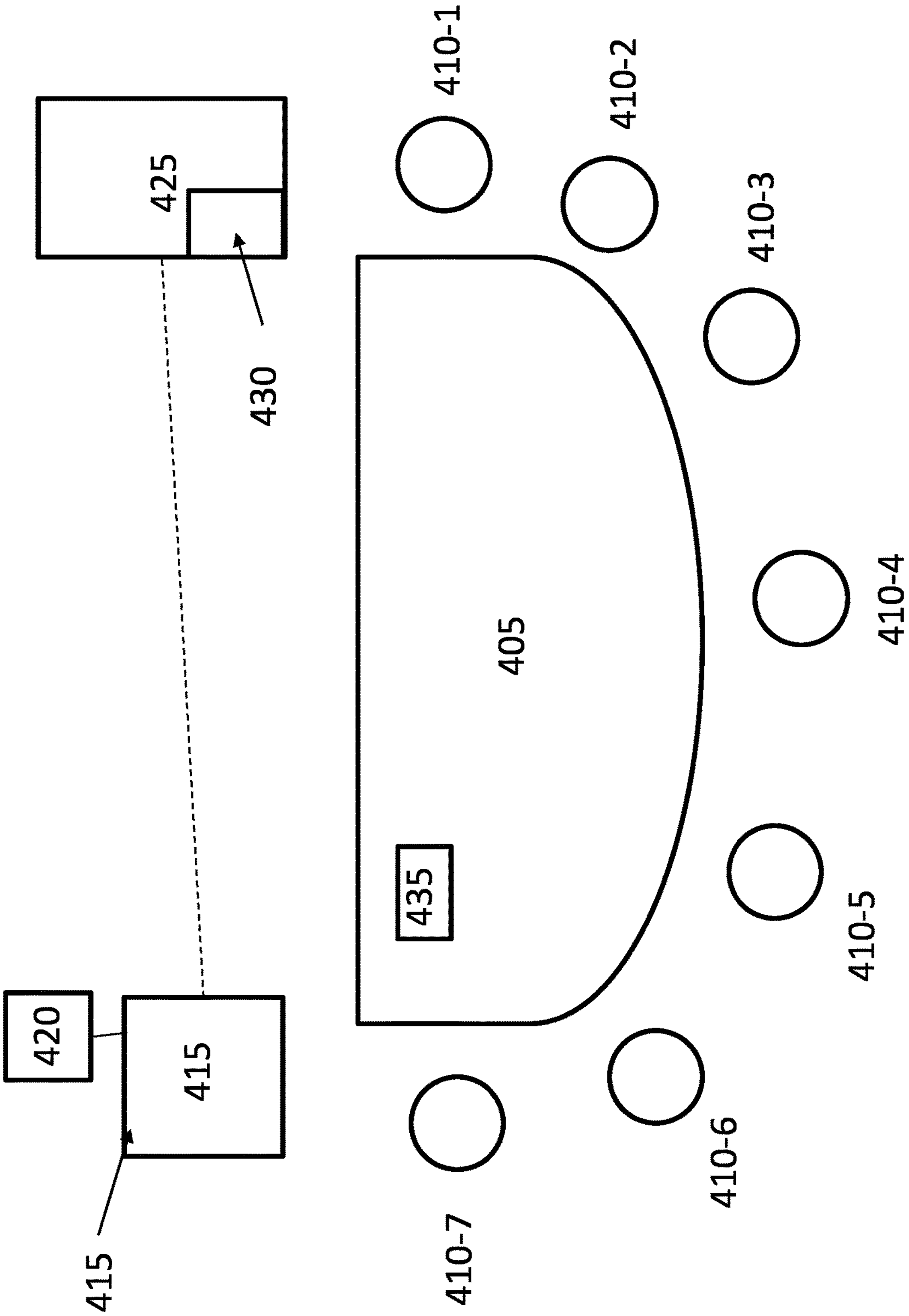
FIG. 4 illustrates a player tracking architecture of the type suitable for the system and method according to the embodiments of the present invention.

FIG. 4 shows an exemplary player tracking system architecture 400 which may facilitate the embodiments of the present invention. Gaming table 405 includes seven player positions 410-1 through 410-N, a display acting as a user interface 415, a card reader or scanner 420 and a connection with a player tracking module 425 running on a central computer system 430. A player card 435 with a magnetic strip holds basic player information including name and player ID. Once the player card 435 is read by the card reader or scanner 420, the player's account is accessed from the player tracking module 210. The dealer may then enter information into the system. The information may include how much the plater cashed in for, amount of player bets, how much the player won or lost during the sessions, etc. As set forth above, RFID systems and other systems may automate some or all of these entries. The objective of the dealer is to keep a reasonably accurate record of the player's play from which comps are based. It is not in the casino's best interest to over-comp or under-comp players.

Dependent on the casino, once a player reaches a threshold number of player's points, the casino may elect to offer comps in the form of cashless chips playable pursuant to pre-established rules. Cashless chips as used herein reflects that the chips have no independent cash value (i.e, they cannot be cashed in—only played at a table game). The cashless chips themselves may take any form as long as they are not confused with cash value chips or other cashless chips such as those used for roulette. For example, the cashless chips may have unique colors, designs, sizes, weights and the like to allow players, dealers and casino personnel to immediately recognize them as cashless chips used to comp players.

Once the player has reached the threshold number of points to earn the cashless chips, the system determines the amount of cashless chips to distribute and notifies the player. The notification may be made directly to the player's email or SMS account or responsive to the player using their player rewards card at the casino. In any instance, the player may pick up the cashless chips at a casino cashier or alternately at a specific table game after the dealer confirms the player is entitled to cashless chips by reading the player's rewards card.

Detailed below are certain pre-established rules that may be accorded the cashless chips. The pre-established rules are exemplary and may be modified by the casino or operator electing to provide comps in such a form.

Figure 5:
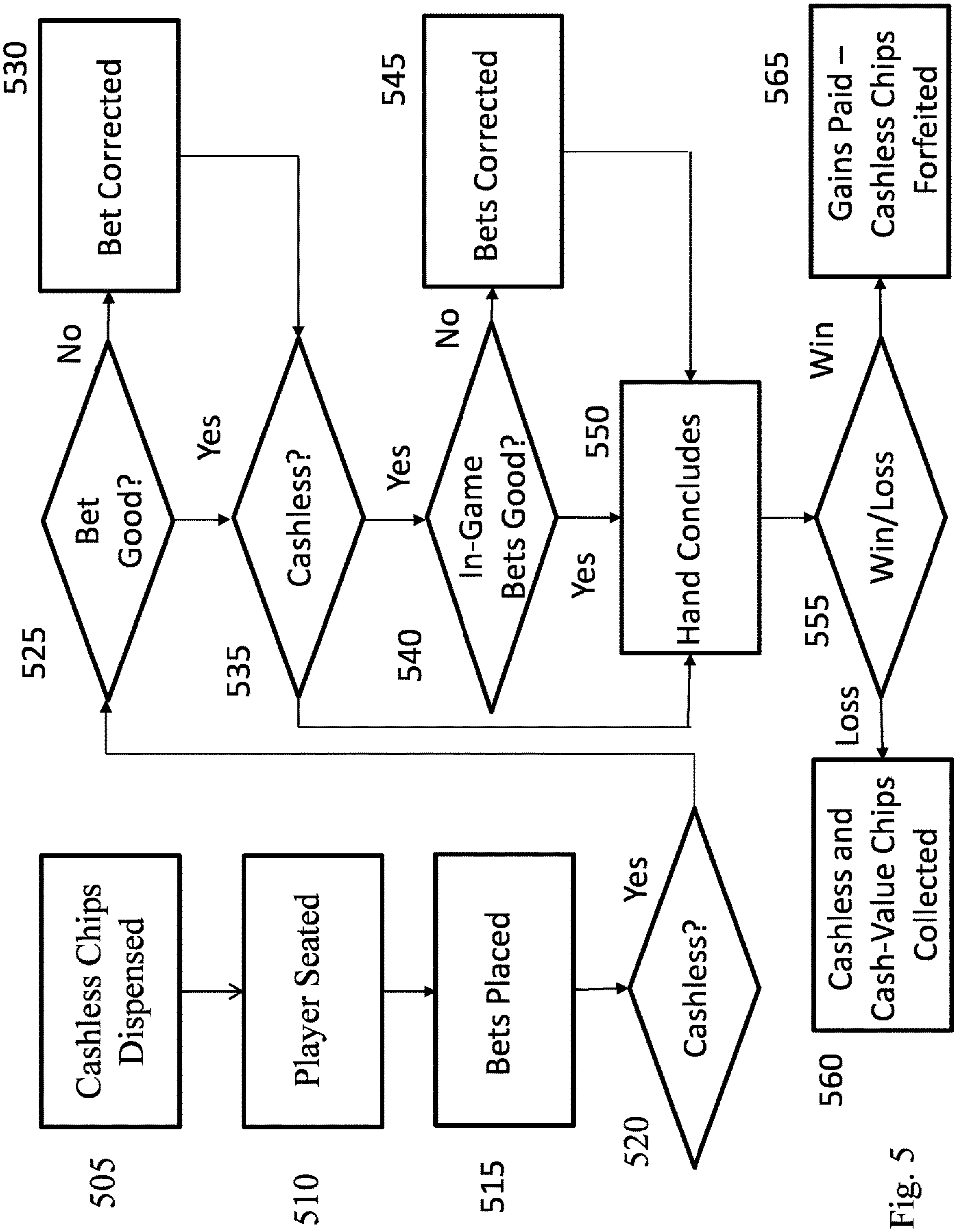
FIG. 5 illustrates a flow chart detailing one method of utilizing the rewards of system according to the embodiments of the present invention.

In one embodiment, as shown in the flow chart 500 of FIG. 5, the cashless chips must be played with cash value chips of equal value (i.e., match play). At 505, player, based on prior tracked play, is provided cashless chips. In this instance, the player has been provided with $100 in cashless chips. At 510, the player sits at a gaming table permitting cashless chips to be played. In one embodiment, all gaming tables accept the cashless chips while in other embodiments the casino or operator may exclude some gaming tables from accepting them. For example, a gaming table being used to field trial a new game, may be excluded. At 515, the player places a primary game bet and optionally bonus bets. At 520, the dealer determines if any cashless chips form part of the bets. In one embodiment, the player is expected to place the cashless chips on top of the stack of gaming chips forming the bet. At 525, the dealer determines, for the primary game bet and any bonus bets, whether the amount of cashless chips is equal to, or less than, the amount of cash-value chips forming the bet. For example, if the player places a $50 primary game bet comprising a $25 cashless chip and a $25 cash-value chip, the $50 bet is acceptable. If, on the other hand, the player places a $50 primary game bet using $20 in cashless chips and $30 in cash-value chips, the bet is rejected since the $20 in cashless chips is not equal to, or more than, the $30 in cash-value chips. The same holds for bonus bets. If the bet is unacceptable, at 530, the bet is corrected. Once acceptable bets have been placed, the game hand is played out. In some games, blackjack for example, additional bets (e.g., double down) may be placed during the hand (i.e., in-game bets). At 535, the dealer determines if any cashless chips form part of the in-game bets. If so, at 540, the dealer determines whether the amount of cashless chips is equal to, or less than, the amount of cash-value chips forming the in-game bet. If the bet is unacceptable, at 545, the bet is corrected. At 550, the game hand is concluded and at 555, it is determined if the player wins or loses the hand. If the player loses the hand and/or bonus bet, at 560, the primary bet and/or bonus bet is collected including cashless chips. If the player wins the hand and/or bonus bet, at 565, the dealer pays the player the gain associated with the bet. That is, the underlying cashless chips are collected and exchanged from cash-value chips. Therefore, the cashless chips are only bet once—win or lose.

By way of example, if a player places a $50 blackjack bet comprising a $25 cashless chip and a $25 cash-value chip and wins the hand, the player is paid $50 in cash-value chips and the $25 cashless chip is forfeited. Therefore, the player is paid the $50 gain in cash-value chips and retains the $25 cash value chip forming part of the $50 bet. In the same blackjack hand, if the player doubled down, using a $25 cashless chip and a $25 cash-value chip for the second bet, the dealer would pay the player $50 on each bet and collect each $25 cashless chip. In this manner, the cashless chips are limited to one play. In alternative embodiments, it is conceivable that the cashless chips may be played more than once.

Figure 6:
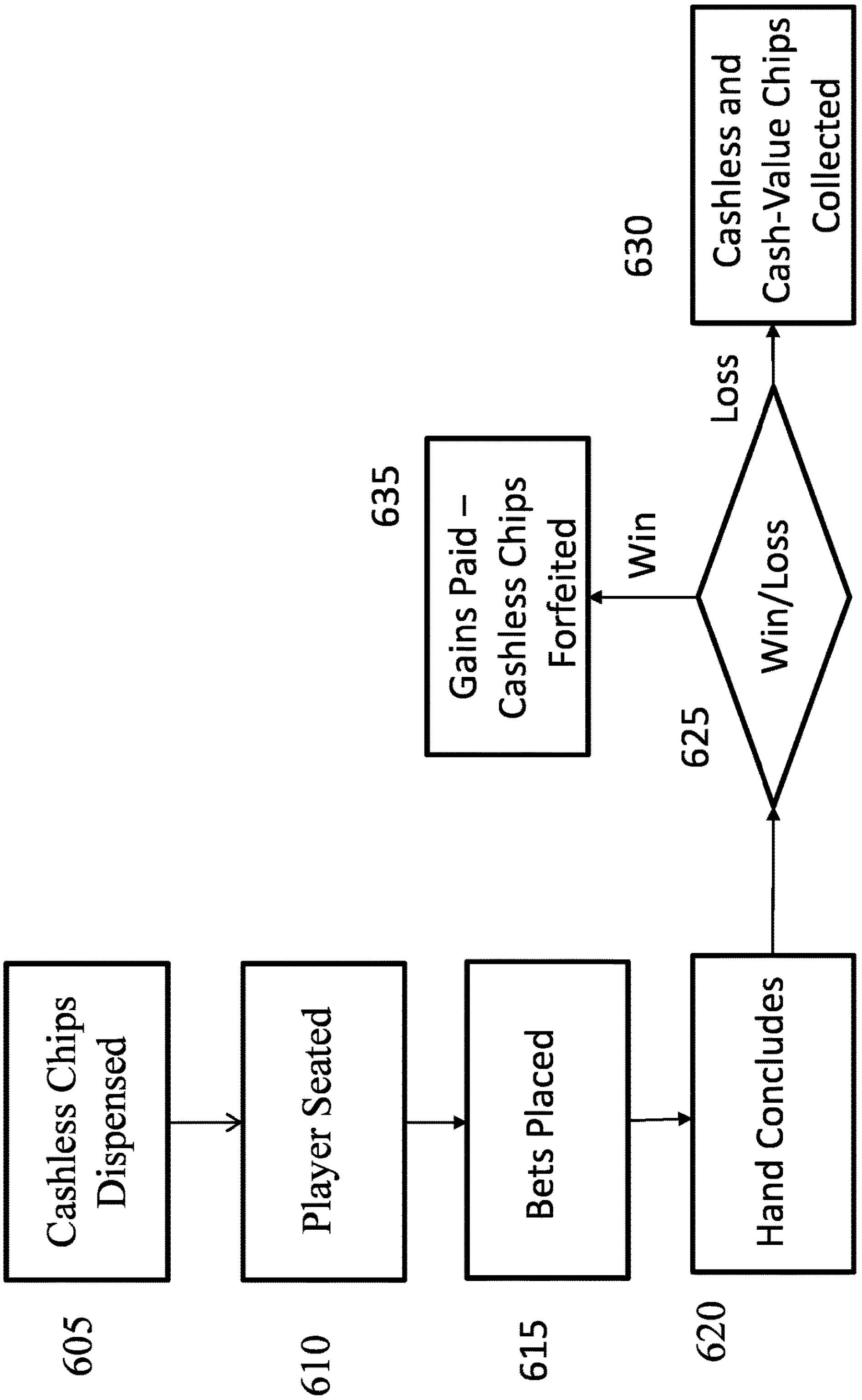
FIG. 6 illustrates a flow chart detailing a second method of utilizing the rewards of system according to the embodiments of the present invention.

In another embodiment, as shown in the flow chart 600 of FIG. 6, the cashless chips may be played on their own without cash value chips or with cash-value chips having less value than the cashless chips. At 605, player, based on prior tracked play, is provided cashless chips. At 610, the player sits at a gaming table permitting cashless chips to be played. At 615, the player places a primary game bet and optionally bonus bets. At 620, the hand is conducted. If the player loses the hand and/or bonus bet, at 625, the primary bet and/or bonus bet is collected including cashless chips. If the player wins the hand and/or bonus bet, at 630, the dealer pays the player the gain associated with the bet. That is, the underlying cashless chips are collected and exchanged for cash-value chips. Therefore, the cashless chips are only bet once—win or lose.

By way of example, if a player places a $50 blackjack bet comprising $50 in cashless chips and wins the hand, the player is paid $50 in cash-value chips and the $50 in cashless chips are forfeited. Therefore, the player has gained $50 in cash-value chips. In the same blackjack hand, if the player hits a two-card blackjack having a 3 to 2 payout, the player is paid $75 in cash-value chips and the $50 in cashless chips are forfeited.

Figure 7:
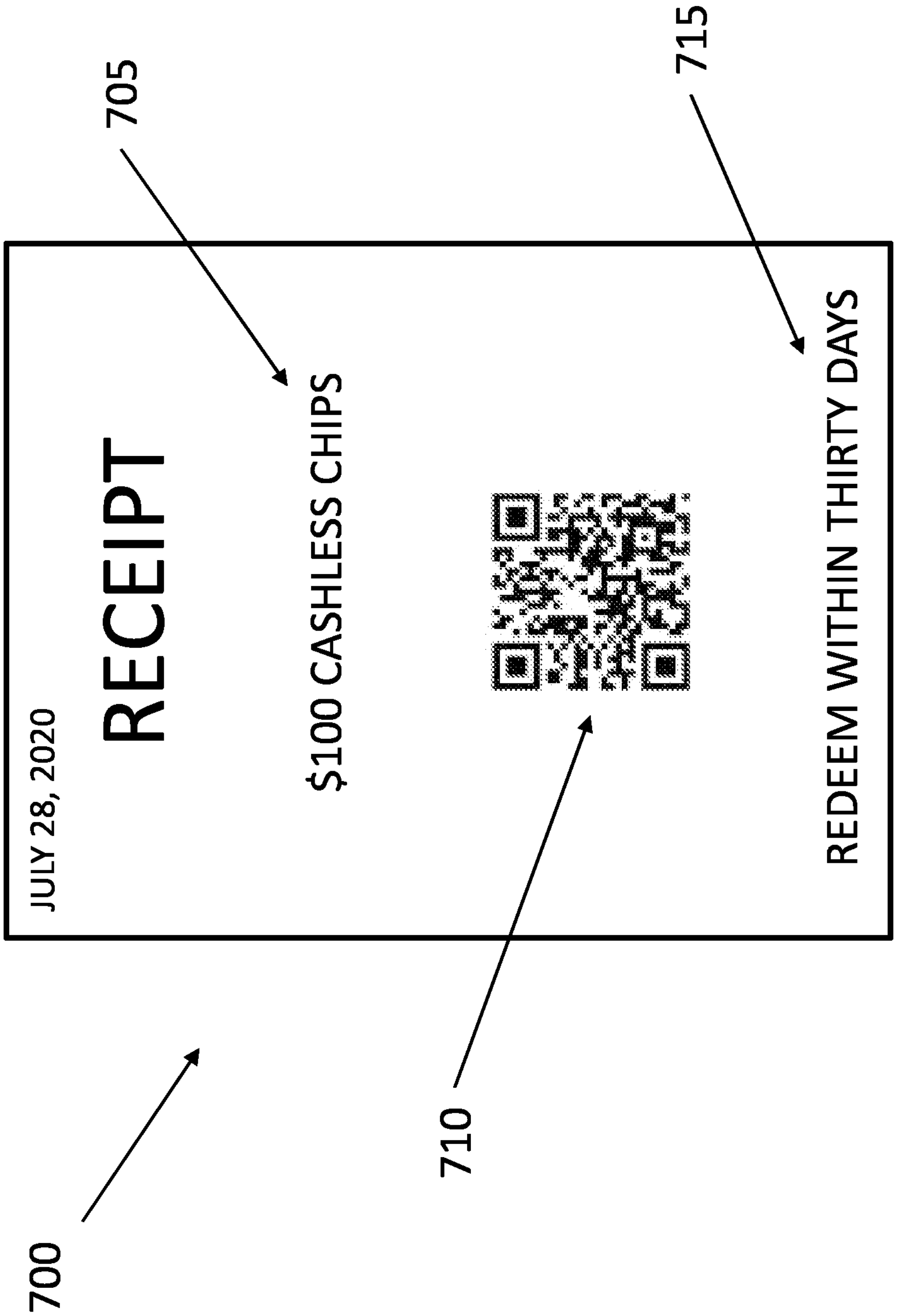
FIG. 7 illustrates a receipt according to the embodiments of the present invention.

Tracking the cashless chips may be facilitated by a casino tracking system. In one embodiment, the player being comped is given a receipt 700, as shown in FIG. 7, depicting at least a cashless chip amount 705 and bar code, QR code or similar machine-readable code 710. The receipt is then taken to the casino cage or casino table to be redeemed for the cashless chips. Casino kiosks may also be configured to dispense cashless chips responsive to reading an inserted receipt. In one embodiment, the casino's player tracking system (or other system) maintains a record of the chips in conjunction with the player. In this manner, when the player redeems the receipt for the cashless chips, the player tracking system is updated to reflect that the player has redeemed the cashless chips. When the player uses the cashless chips, dealers may input the usage thereof manually into the player tracking system via the local computer interface on the subject gaming table. In one embodiment, the cashless chips are non-transferable and thus the dealer must check with the casino player tracking system to determine if the player, as identified by the dealer, has eligible cashless chips to play. The receipt and cashless chips may each have expiration dates 715 if not redeemed or played in the time, respectively, allotted by the casino.

In one embodiment, the cashless chips are counted towards the table limits of the casino. Alternatively, only cash value chips count towards the table limits of the casino. In one embodiment, if the player pushes a hand, the cashless chips are forfeited. As set forth above, the casino or operator is free to implement rules of its choosing.

Figure 8:
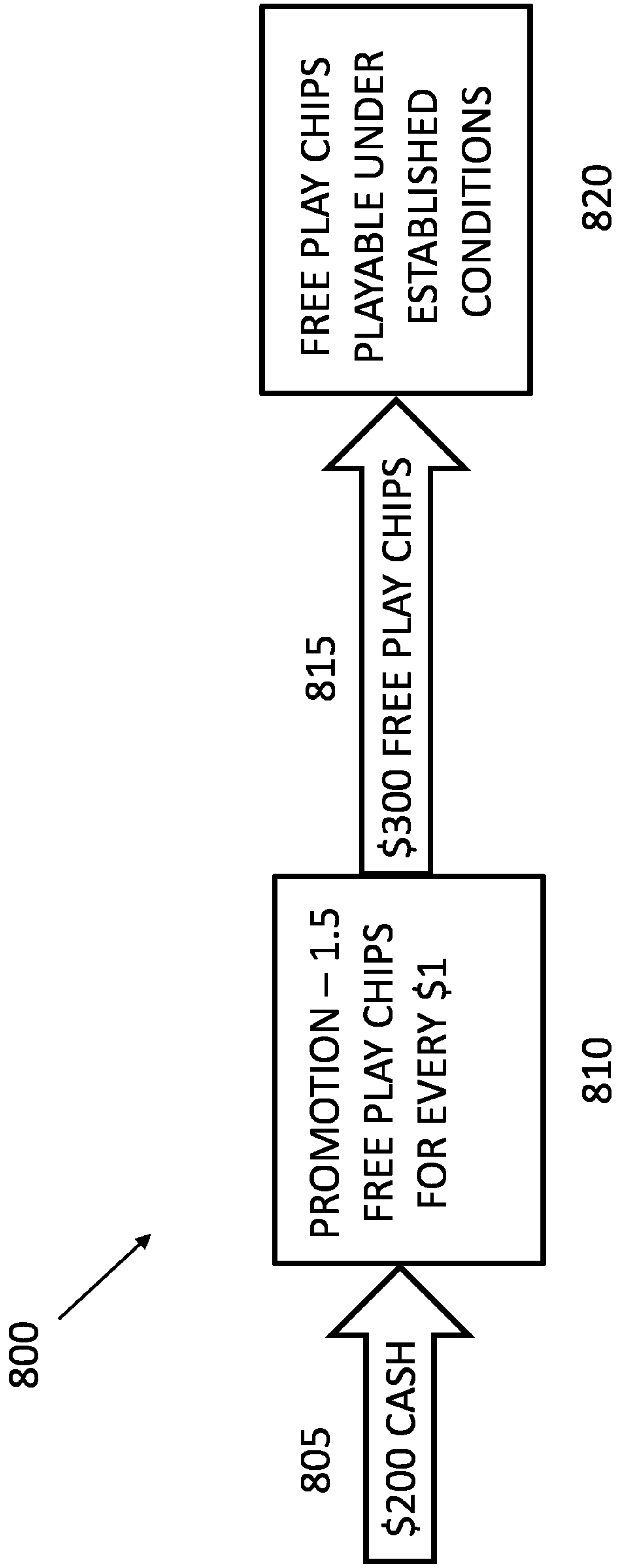
FIG. 8 illustrates a block diagram of a promotion involving an exchange of free play chips for cash according to the embodiments of the present invention.

In another embodiment, the system and method are utilized to implement a casino promotion whereby players are provided with free play chips in excess of the cash they deposit for play. For example, as shown in the block diagram 800 of FIG. 8, a player may exchange $200 cash for $300 in free play chips. Ultimately the casino determines the ratio of free play chips to cash. Referring to FIG. 8, at 805 a player provides cash in exchange for free play chips. At 810, an amount of free play chips is calculated by an exchange rate module based on the casino's established exchange rate. The exchange rate may be uniform or tiered to accommodate different types of players whereby better players (e.g., those betting larger units) receive a more favorable exchange rate or may be based on the amount cashed in whereby larger amounts cashed in receive a more favorable exchange rate. At 815, the free chips are provided to the player. At 820, the player plays the free play chips, like those described above, under certain conditions. By way of example, if the player bets the $300 in free play chips on a single hand of blackjack and wins the hand, the player is paid $300 in cash and forfeits the $300 in free play chips. In this manner, the player can bet more than the cash initially exchanged thus having the opportunity to win more while risking less.

In this embodiment, the promotion may be limited to player club players having a certain amount of earned comps. In such an embodiment, players may be provided with a free play chips confirmation receipt (see FIG. 7) for redemption at a casino cage. Those skilled in the art will recognize that the parameters of promotion can be countless without departing from the spirit and scope of the embodiments of the present invention.

Although the invention has been described in detail with reference to several embodiments, additional variations and modifications exist within the scope and spirit of the invention as described and defined in the following claims.

I claim:

1. A gaming system comprising:

a player tracking system configured to track play of registered players at casino games of chance, said player tracking system configured to determine when registered players reach a threshold level of play, said player tracking system in communication with a plurality of table games and configured to authorize disbursement of non-transferable cashless chips at one or more of said plurality of table games based on a table game computer reading a player rewards card to access said player tracking system and confirm non-transferable cashless chips are available for a player;

a receipt printer configured to print receipts redeemable for said non-transferable cashless chips, said receipts depicting an amount of non-transferable cashless chips available to a player;

a cashless chip tracking system configured to track non-transferable cashless chips provided to players reaching said threshold level of play;

a comp system configured to provide players with comps based on level of play; and wherein, responsive to a player being identified and verified to have been provided with non-transferable cashless chips in a certain amount, said non-transferable cashless chips may be played by said identified player, with or without corresponding cash chips, at one or more table games offered by the casino providing the non-transferable cashless chips, said non-transferable cashless chips having no independent cash value and unavailable to be played at games undergoing a field trial; and wherein said non-transferable cashless chips do not count towards table limits such that players holding said non-transferable cashless chips may, by using said non-transferable cashless chips, bet more than table limits.

2. The gaming system of claim 1 wherein said non-transferable cashless chips may be played only once and then are forfeited.

3. The gaming system of claim 1 wherein said receipts may be redeemed at a casino cage or table game.

4. The gaming system of claim 1 wherein said receipts may be redeemed at a kiosk.

5. A gaming system comprising:

a player tracking system configured to track play of registered players at casino games of chance, said player tracking system configured to determine when registered players reach a threshold level of play, said player tracking system in communication with a plurality of table games and configured to authorize disbursement of non-transferable cashless chips at one or more of said plurality of table games based on a table game computer reading a player rewards card to access said player tracking system and confirm non-transferable cashless chips are available for a player;

a receipt printer configured to print receipts redeemable for said non-transferable cashless chips, said receipts depicting an amount of non-transferable cashless chips available to a player;

non-transferable cashless chips designated to be dispensed as comps to players reaching said threshold level of play; and wherein, responsive to a player being identified and verified to have been provided with non-transferable cashless chips in a certain amount, said non-transferable cashless chips may be played by said identified player, with or without corresponding cash chips, at one or more table games offered by the casino providing the non-transferable cashless chips, said non-transferable cashless chips having no independent cash value and unavailable to be played at games undergoing a field trial; and wherein said non-transferable cashless chips do not count towards table limits such that players holding said non-transferable cashless chips may, by using said non-transferable cashless chips, bet more than table limits.

6. The gaming system of claim 5 wherein said non-transferable cashless chips may be played only once and then are forfeited.

7. The gaming system of claim 5 wherein said receipts may be redeemed at a casino cage or table game.

8. The gaming system of claim 5 wherein said receipts may be redeemed at a kiosk.

9. A method of comping a player comprising:

utilizing a player tracking system to track play of registered players at casino games of chance and determine when registered players reach a threshold level of play, said player tracking system in communication with a plurality of table games and configured to authorize disbursement of non-transferable cashless chips at one or more of said plurality of table games based on a table game computer reading a player rewards card to access said player tracking system and confirm non-transferable cashless chips are available for a player;

utilizing a receipt printer configured to print receipts redeemable for said non-transferable cashless chips, said receipts depicting an amount of non-transferable cashless chips available to a player;

utilizing a cashless chip tracking system to track non-transferable cashless chips;

providing players with comps based on level of play, including providing non-transferable cashless chips to players reaching said threshold level of play; and wherein, responsive to a player being identified and verified to have been provided with non-transferable cashless chips in a certain amount, allowing said non-transferable cashless chips to be played by said identified player, with or without corresponding cash chips, at one or more table games offered by the casino providing the non-transferable cashless chips, said non-transferable cashless chips having no independent cash value and unavailable to be played at games undergoing a field trial; and not counting said non-transferable cashless chips towards table limits such that players holding said non-transferable cashless chips may, by using said non-transferable cashless chips, bet more than table limits.

10. The method of claim 9 further comprising permitting said non-transferable cashless chips to be played only once.

11. The method of claim 9 further comprising configuring said receipts to be redeemable at a casino cage or table game.

12. The method of claim 9 further comprising configuring said receipts to be redeemable at a kiosk.

13. The method of claim 9 further comprising permitting said non-transferable cashless chips to be played as part of match play with cash-value gaming chips.

14. The method of claim 9 further comprising permitting said non-transferable cashless chips to be played without any cash-value gaming chips.

15. The method of claim 9 further comprising limiting a time period during which the non-transferable cashless chips may be played.

16. The method of claim 9 further comprising limiting which table games said non-transferable cashless chips may be used.

* * * * *